United States Patent [19]

Heslop et al.

[11] 4,173,377
[45] Nov. 6, 1979

[54] CHASSIS MOUNTING FOR A MACHINE

[75] Inventors: Philip J. Heslop, Wokingham; Roger J. Matthews, Slough, both of England

[73] Assignee: Mars Limited, London, England

[21] Appl. No.: 876,097

[22] Filed: Feb. 8, 1978

[30] Foreign Application Priority Data

Feb. 9, 1977 [GB] United Kingdom ................ 5371/77

[51] Int. Cl.² ............................................. A47B 81/00
[52] U.S. Cl. ...................................... 312/29; 221/281; 312/307; 312/313; 312/350
[58] Field of Search ...................... 312/22, 23, 29, 28, 312/208, 296, 293, 304, 307, 312, 313, 350; 221/281

[56] References Cited

U.S. PATENT DOCUMENTS

| 1,385,233 | 7/1921 | Stafford | 312/22 |
| 2,331,576 | 10/1943 | Siskin | 312/29 |
| 2,520,380 | 8/1950 | Wegman | 312/293 |
| 3,404,930 | 10/1968 | Cafiero et al. | 312/313 |

Primary Examiner—Mervin Stein
Assistant Examiner—Alexander Grosz
Attorney, Agent, or Firm—Curtis, Morris & Safford

[57] ABSTRACT

A machine includes a housing with a door or panel which is removable to provide an opening for access to the interior of the machine. The chassis which is normally horizontal carries two rear rollers at its sides near the rear of the chassis. The rear rollers engage horizontal guide rails on the sides of the housing. The chassis carries two front rollers at its sides near the front of the chassis. The front rollers engage a vertical guide. By these means the chassis is movable between its normal horizontal position and a vertical position in the opening at the front of the machine so that components on the underside of the chassis are accessible for servicing and repair.

8 Claims, 3 Drawing Figures

CHASSIS MOUNTING FOR A MACHINE

The present invention relates to machines in which working components of the machine are mounted on a chassis which is located within a housing.

When such machines require servicing or repair it is often difficult to work on the component on the chassis in the machine, particularly when they are placed on the underside of a chassis mounted near the bottom of the machine or on top of a chassis near the top of the machine.

One proposal for alleviating this problem is to mount the chassis on horizontal telescopic slides so that the chassis can be drawn to a position partially outside the machine. The engineer, with this arrangement, has more space around the chassis in which to work but he may still have to work in an awkward position, for example underneath a low-placed chassis or above a highplaced chassis. Furthermore, with such an arrangement when the chassis is drawn forward out of the housing, the center of gravity of the machine may be moved forward to such an extent as to make the machine unstable, particularly if the weight of the chassis and the components carried by it is great compared with the weight of the rest of the machine.

According to the present invention a machine includes working components mounted on a normally horizontal chassis which is located within a housing having a panel or door which is movable or removable to provide an opening to give access to the interior of the housing, the chassis being supported in the housing by locating and guiding means such that the chassis can be moved between its normal horizontal position within the housing and an inclined or a vertical position in the opening.

By employing the present invention it is possible to construct a machine in which components on the chassis that are difficult to reach when the chassis is in its normal position are presented in the opening facing outwardly towards the engineer when the chassis is in the inclined or vertical position. The servicing and repair of the components is thus facilitated. Because of the tilting of the chassis, it is possible to make the components accessible without moving the chassis out of the housing. Thus the machine is more stable when the engineer is working on the components that with the known telescopic arrangements.

Conveniently the locating means may comprise two pairs of runners or rollers on opposite sides of the chassis, one runner or roller of each pair being located near the back of the chassis as viewed through the opening, when the chassis is horizontal, and one runner or roller being located near the front. Each rear runner or roller engages a corresponding horizontal guide on the side of the housing and each front roller engages a corresponding vertical guide at the front of the housing as viewed through the opening. With this arrangement when the chassis is moved forward towards the opening from the normal horizontal position, the front runners or rollers move vertically and the rear runners or rollers move horizontally so that the chassis is tilted towards the vertical. Each horizontal guide may be provided with a depression at its front end for receiving the rear roller when at the forward end of the rail to maintain the chassis in the forward tilted or vertical position. A similar depression may also be provided at the rear of each horizontal guide to locate the chassis when in the horizontal position.

The vertical guide may for convenience be a flange at the side of the opening in the machine. Preferably the vertical guides include means for supporting the front rollers from behind so that when the chassis is in the vertical position a horizontal force may be applied to the chassis without the chassis moving back towards the horizontal position.

An embodiment of the invention will now be described by way of example with reference to the accompanying drawings of which:

Figure 1:
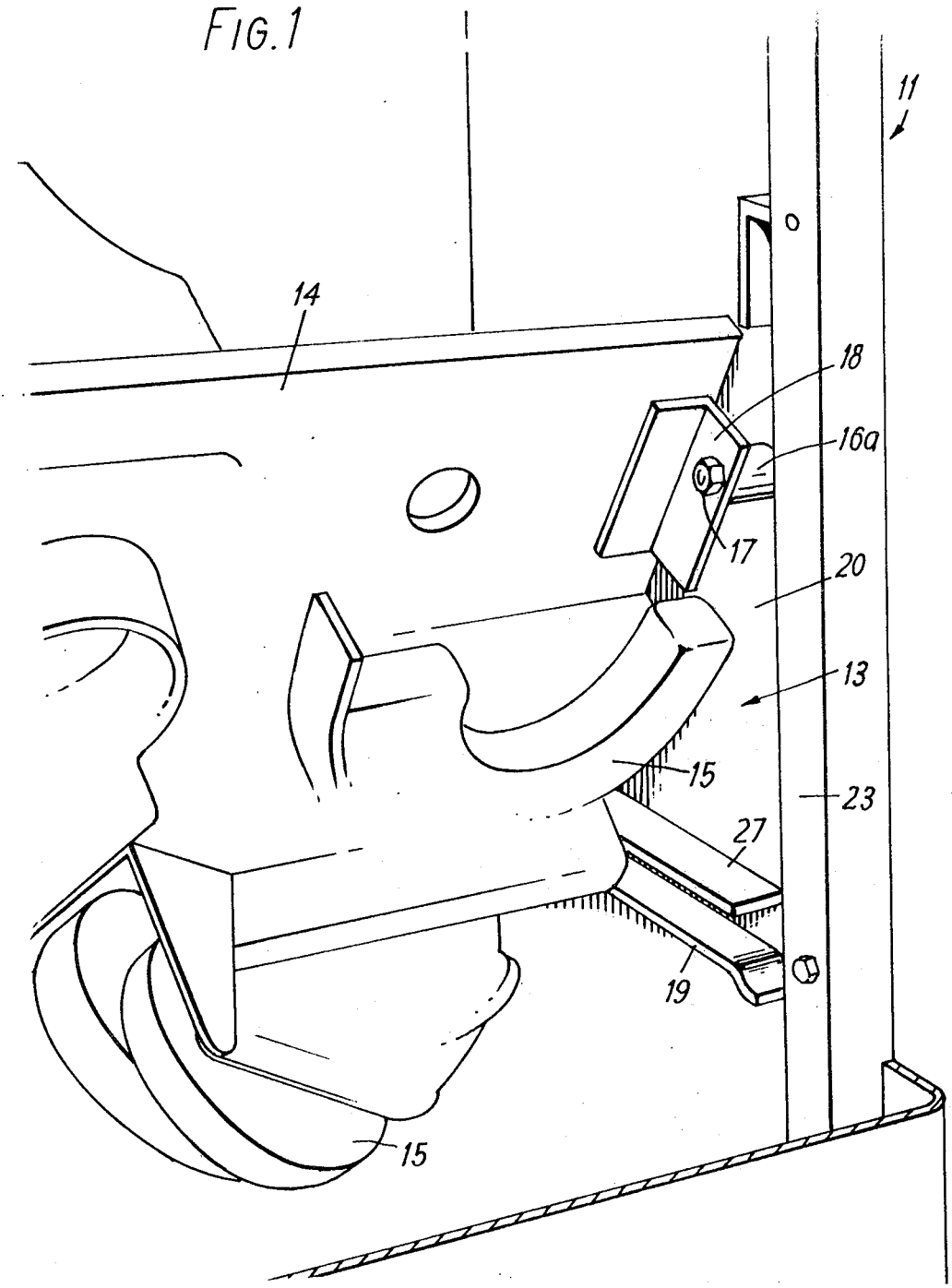
FIG. 1 shows a fragmentary perspective view of a machine with the front panel removed.
Figure 2:
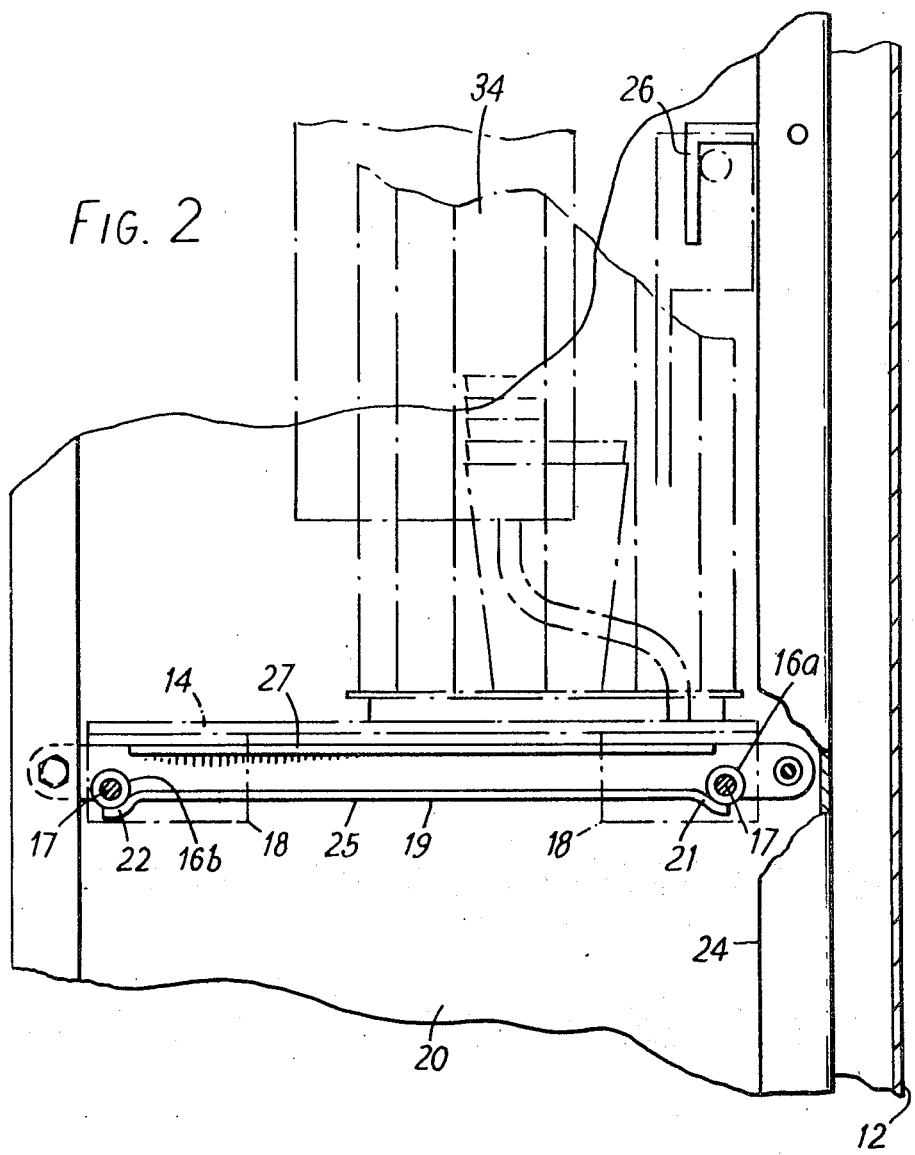
FIG. 2 shows a vertical fragmentary cross-section from the side of the machine of FIG. 1.
Figure 3:
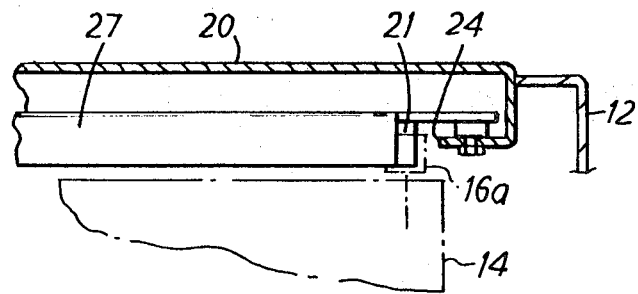
FIG. 3 shows a horizontal fragmentary cross-section of the machine of FIG. 1.

Referring to the drawings these show a beverage dispensing vending machine comprising a generally rectangular housing 11 of sheet metal with a front door or panel 12 that is detachable to provide an opening 13 for access to the internal working parts contained within the housing 11. FIG. 1 shows the casing with the front panel removed.

The internal working part of the machine includes a rotary cup holder 34 that can be lifted out of the machine when the machine is being serviced or repaired. Other working components are carried by a chassis 14 mounted horizontally within the housing. These components include various components 15 mounted on the underside of the chassis 14. As the chassis is mounted near the bottom of the machine servicing the components on the underside of the chassis is difficult, when the chassis is in its normal horizontal position.

To facilitate servicing of the components 15 on the underside of the chassis, therefore, the chassis is mounted so that it can be moved from its normal horizontal position into a vertical position at the front of the machine. To this end, the chassis has four nylon rollers 16a and 16b rotatably mounted on stub shafts 17 carried by brackets 18 on the underside of the chassis 14. The rollers are positioned two on each of the side edges of the chassis with one roller 16a on each edge near the front of the chassis and one 16b at the rear of the chassis.

In the horizontal position of the chassis the rollers rest on horizontal rails 19 fixed to the side walls 20 of the housing 11, depressions 21 and 22 being provided at the front and back of the rails to receive the rollers 16a and 16b respectively and retain them against accidental displacement from the normal horizontal position.

On both sides of the opening 13 the housing has a flange 23 which is turned first inwardly and then rearwardly from the side walls of the housing.

When an engineer wishes to service components on the underside of the chassis 14, he pulls the chassis forward and at the same time lifts the front of the chassis upwardly. The rollers 16b ride out of the depressions 22 and the front rollers 16a run up the rear edges 24 of the flange 23 which thus acts as a vertical guide, while the rear rollers 16b run on the straight parts 25 of the rails 19 that lie between the depressions 21 and 22. As the chassis is thus pulled forward it is inclined progressively towards the vertical until the rear rollers 16b drop into the front depressions 21. In this position the front rollers are located between the flanges 23 and brackets 26 fixed on the housing. The depressions 21 and the brackets 26 provide support for the chassis from behind against moderate forces applied to chassis horizontally from the front so that the engineer can work on the components on the chassis satisfactorily with the chassis in a vertically inclined position. In this position the components on the underside of the chassis face outwardly toward the engineer. The chassis is located entirely behind the front line of the machine.

Horizontal rails 27 are disposed above the rails 19 to prevent the rollers being lifted away from the rails 19. If it is desired to secure the chassis in an intermediate inclined position the chassis may be twisted so that it is in a skew position so that one of the rollers 16b bears against the side wall of the housing between the rails 19 and 27. If it is desired to remove the chassis from the housing, the chassis should be twisted further so that the rollers 16b are clear of the rails 19 and 27 and the rollers 16a are clear of the flanges 23. In this skew orientation the chassis may be withdrawn from the housing through the front opening 13.

We claim:
1. A machine comprising:
a housing;
an opening in a vertical wall of said housing, said opening providing access to the interior of said housing;
panel means covering said opening, said panel means being movable or removable to expose said opening;
a normally-horizontal chassis mounted in said housing;
working components on said chassis, at least some of the working components being difficult of access when the chassis is in the normal horizontal position;
locating and guiding means for said chassis whereby said chassis is movable between its normal horizontal position within said housing and an inclined position adjacent said opening, the said some working components being adjacent said opening and facing outwardly of the machine when the chassis is in inclined position; and
means for holding the chassis in the inclined position.

2. A machine as claimed in claim 1 wherein said locating means comprise rear locating means carried by said chassis near its side remote from said opening and front locating means carried by said chassis near its side adjacent said opening and said guides means comprise horizontal guide means along the side of the housing engaged by said rear locating means and vertical guide means near the sides of the opening engaged by said front locating means.

3. A machine as claimed in claim 2 wherein said locating means comprise rollers.

4. A machine as claimed in claim 2 wherein said horizontal guide means comprise rails on opposite sides of said housing.

5. A machine as claimed in claim 4 wherein said horizontal guide rails have depressions constituting said holding means at their ends adjacent the opening to receive the rear locating means to maintain the chassis in the forward inclined position.

6. A machine as claimed in claim 2 wherein said chassis when in the tilted or vertical position does not project beyond the line of the machine.

7. A machine comprising:
a housing;
an opening in a vertical wall of said housing, said opening providing access to the interior of said housing;
panel means covering said opening, said panel means being movable or removalbe to expose said opening;
a normally-horizontal chassis mounted in said housing;
working components on said chassis;
locating and guiding means for said chassis whereby said chassis is movable between its normal horizontal position within said housing and an inclined position adjacent said opening;
said locating means comprising rear locating means carried by said chassis near its side remote from said opening and front locating means carried by said chassis near its side adjacent said opening;
said guide means comprising horizontal guide means along the sides of the housing engaged by said rear locating means and vertical guide means near the sides of the opening enaged by the said front locating means; and
said vertical guide means comprises a flange at each side of said opening.

8. A machine comprising:
a housing;
an opening in a vertical wall of said housing, said opening providing access to the interior of said housing;
panel means covering said opening, said panel means being movable or removable to expose said opening;
a normally-horizontal chassis mounted in said housing;
working components on said chassis;
locating and guiding means for said chassis whereby said chassis is movable between its normal horizontal position within said housing and an inclined position adjacent said opening;
said locating means comprising rear locating means carried by said chassis near its side remote from said opening and front locating means carried by said chassis near its side adjacent said opening;
said guide means comprising horizontal guide means along the sides of the housing engaged by said rear locating means and vertical guide means near the sides of the opening enaged by the said front locating means; and
means for supporting said front locating means from behind when said chassis is in the inclined position.

* * * * *